May 3, 1938.  J. HALTENBERGER  2,115,768
AUTOMOBILE WHEEL COVER FASTENER
Filed June 10, 1935
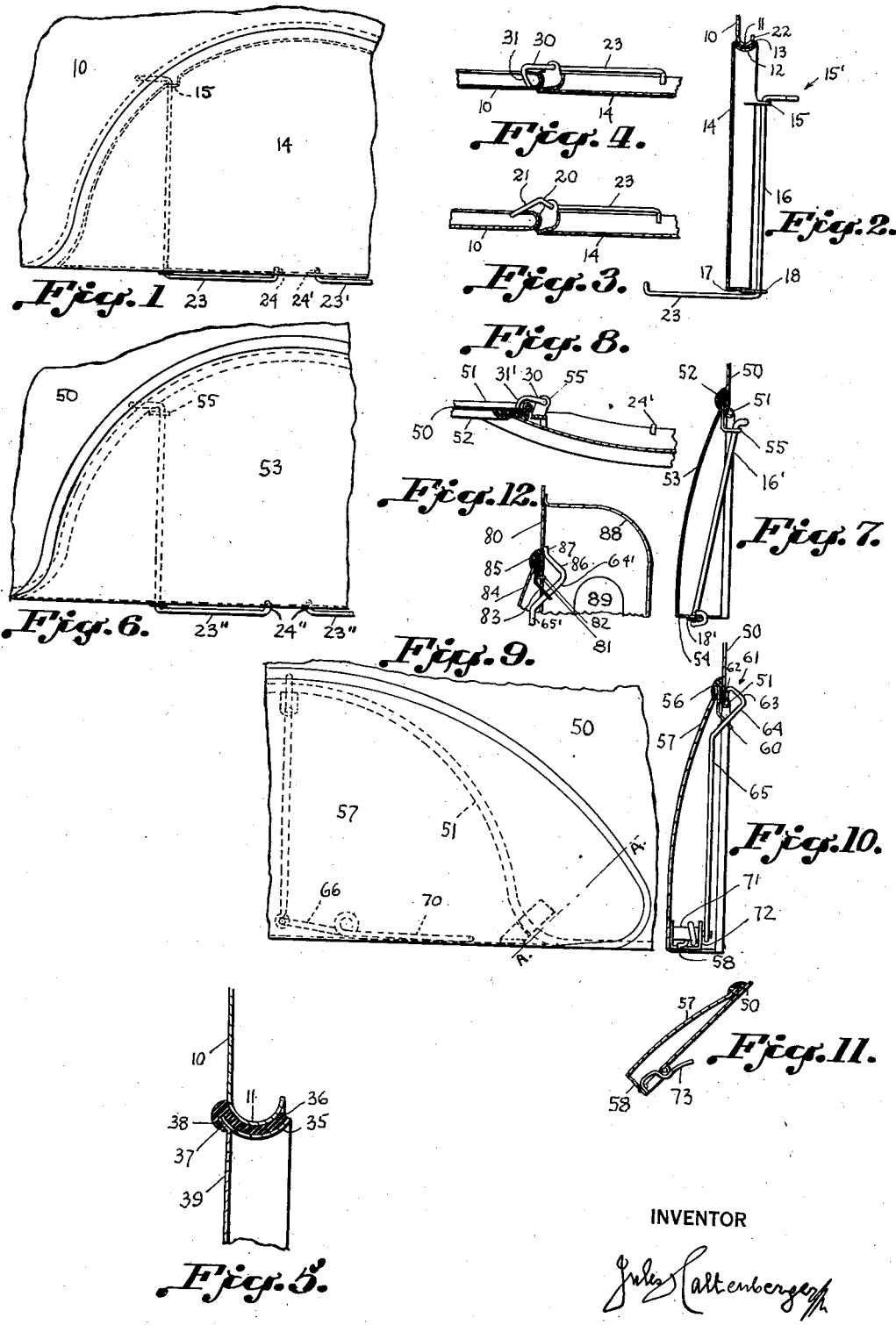
INVENTOR
Jules Haltenberger Patented May 3, 1938

2,115,768

UNITED STATES PATENT OFFICE 2,115,768

AUTOMOBILE WHEEL COVER FASTENER

Jules Haltenberger, Indianapolis, Ind.

Application June 10, 1935, Serial No. 25,773

2 Claims. (Cl. 292—256)

This application relates to automobile wheel cover fasteners, and is thus directed to the same subject of invention as my copending application Serial No. 705,717, filed January 8, 1934.

The invention forming the subject matter of the present application relates to wheel covers and their mountings.

It is the object of my invention to simplify accessory wheel cover manufacturing and to provide mounting mechanisms that do not attach to the outside exposed wall surfaces nor to the inside of such walls to eliminate the necessity of riveting or electric welding at those places and surface grinding incident to repairing such outside surfaces.

A further object is to eliminate the fender and mount the wheel cover directly on the body.

A further object is to simplify the mounting mechanism. To use a combined motion sliding lock and to mount it in such way as to permit the use of thinner and lighter sheet metal for accessory wheel covers or wheel covers replacing the fenders.

Further, and more particularly expressed, objects of the invention will appear as the description proceeds.

For the accomplishment of the above and related objects, by invention may be embodied in the forms illustrated in the accompanying drawing: Fig. 1 is a side elevation of an upwardly inserted and upwardly held wheel cover with parts broken away; Fig. 2 is a fragmental vertical section of the cover in Fig. 1 with the mounting mechanism in released position; Fig. 3 is a fragmental horizontal section of the cover illustrated in Fig. 1 showing the mounting mechanism in engaged position; Fig. 4 is an upwardly inserted horizontally clamped wheel cover a modification of Fig. 3; Fig. 5 is a fragmental section of a two-piece construction of the periphery of the cover shown in Figs. 1, 2, 3, and 4 illustrated in a somewhat larger scale; Fig. 6 is a side elevation of a horizontally or substantially horizontally mounted and horizontally clamped wheel cover with parts broken away, a modification of the invention illustrated in Fig. 1; Fig. 7 is a fragmental vertical section of the cover illustrated in Fig. 6; Fig. 8 is a fragmental horizontal section of the cover illustrated in Fig. 6; Fig. 9 is a side elevation of an upwardly inserted and upwardly held cover with parts broken away, a modification of the invention illustrated in Fig. 1; Fig. 10 is a fragmental vertical section of the cover illustrated in Fig. 9; Fig. 11 is a fragmental section of the cover illustrated in Fig. 9 substantially on line A—A; Fig. 12 is a modification of the upper part of the invention illustrated in Fig. 10; Fig. 13 is a further modification of the upper part of the invention illustrated in Fig. 10 illustrated in a somewhat larger scale.

Referring to the drawing and particularly to Figs. 1, 2 and 3 it will be seen that a depending wall 10, either a side wall of an automobile body or the depending outer wall of a fender, has a wheel exposing opening defined by a curved inturned edge 11. Edge 11 is partially surrounded by a channel 12. Interposed between them is rubber sealer 13. Channel 12 is integral with a substantially D-shaped cover or closure 14.

As is clear from the drawing, cover 14 is horizontally and vertically positioned by edge 11 and flange 12 respectively because they partially surround each other therefore the cover 14 is inserted to its place by a substantially vertical motion.

Channel 12 is provided with a flattened and substantially a horizontal protrusion 15 to serve as the upper bearing for an angular clamp indicated generally at 15' and specifically for the reach 16 which is preferably of spring steel. Cover 14 is provided with a bottom flange 17. On this flange is mounted as by spot-welding a lug 18 to serve as a lower bearing for the reach 16. For certain applications the flange 17 is perforated to serve as a lower bearing (not shown).

Reach 16 is bent above protrusion 15 to serve as a pressure arm 20 and arm extension 21 as is clearly shown in Fig. 3. Pressure arm extension 21 is seated on periphery 22 of edge 11. Reach 16 is bent below bracket 18 to serve as operating arm 23 and is provided at its extreme end with a flange hook 24 arranged to hook into flange 17 when in tensioned or engaged position. It is important that pressure arm extension 21 and operating arm 23 be bent in generally opposite directions when it is desired that operating arm flange hook 24 should lay against the inside of flange 17 so as normally not to be visible. The generally opposite directional bending of pressure arm extension 21 and operating arm 23 must have a correct angle of opposition with due consideration of the length of these arms in relation to the thickness and length of reach 16 in view of the lifting pressures desired. As is clear from Fig. 1, that portion of periphery 22 where pressure arm extension 21 is seated is substantially on a 45° angle to the axis of reach 16, therefore, there will be a component of a force working on a 45° incline that will yieldingly urge and force the cover 14 upwardly by the upward surface pressure extended on lug 18 by the lower end of reach 16. The cover can be locked in its place under tension by positioning flange hook 24 against the inner end of flange 17.

Clamp 15' is preformed. Its upper end is laced into protrusion 15; on its bottom is laced lug 18; then the lug is welded or riveted to flange 17.

As is also clear from the drawing, the clamp when in released position, that is, when turned substantially 90° from the positions shown in Figs. 1 and 3, the pressure arm 20 and arm extension 21 respectively will clear the periphery 22 with a large margin assuring a clear path for the upward insertion of the cover 14.

Be it clearly understood that whereas these figures show but one torsion lock and unless the cover is fulcrumed at one side (not shown) two are necessary, as is indicated in Fig. 1, where the other reach, operating arm 23' and flange hook 24' are shown at the bottom right hand corner.

The above description describes a mounting means that leaves the main exposed wheel cover face unblemished as all the attaching means of the reach are fastened to the invisible parts of the wheel cover. This is of great importance if it is realized that the outside face of the wheel cover is coated with paint and is finally highly polished reflecting the least blemish in multi-plied form. By leaving the main exposed face free of rivetings or weldings, production rejections are materially reduced and surface grinding and "filling" of blemished places are eliminated and this also permits the use of lighter gauge metal for said wheel covers. Figs. 1, 2 and 3 indicate clearly that the depending wall upon which the wheel cover is mounted remains free of rivets or weldings also and remains unblemished and is left in the condition in which it arrives from the motor car manufacturer when the wheel cover is used as an accessory.

Fig. 4 illustrates a modification of the construction described in connection with Figs. 1, 2, and 3 and as only the pressure arm and pressure arm extension are different only these and their functions will be described, to avoid repetition. Here pressure arm 30 is provided with a curved pressure arm extension 31 arranged to clear slightly the periphery 22 and to abut against the inner face of cover 14, therefore, the pressure of the clamp by reaction on the protrusion 15 will tend to press the cover 14 yieldingly horizontally inwardly.

Fig. 5 illustrates a modification of wheel cover channel construction. Here inturned edge 11 is partially surrounded by channel 35. Interposed between them is rubber sealer 36. This sealer is provided with a rubber lip 37. Between rubber sealer 36 and rubber lip 37 is the outer edge of channel 35 and mating with it is flange 38, integral with cover 39. Flange 38 as by spot welding is firmly attached to channel 35. Such weld and its disfigurations are hidden by the rubber lip 37.

Figs. 6, 7 and 8 illustrate a modification of the applicant's invention. Here depending wall 50 has a wheel exposing opening defined by an inturned edge 51. On the wall 50 substantially opposite to edge 51 is a rubber sealer 52 surrounding the periphery of a closure or wheel cover 53. This cover is provided with a bottom flange 54. Cover 53 is provided with a bracket 55 arranged to serve as the upper bearing for reach 16' and a lug 18' is mounted on flange 54 to serve as lower bearing for reach 16'.

Reach 16' is bent above bracket 55 to serve as pressure arm 30' and is provided with a curved arm extension 31' arranged to slightly clear or slightly hug inturned edge 51.

Reach 16' is bent below bracket 18' to serve as operating arm 23'' and is provided at its extreme end with a flange hook 24'' arranged to hook into flange 54 when in tensioned engaged position.

As is clear from Figs. 6, 7, and 8 the clamp when in released position will permit a clear horizontal or substantially horizontal path of mounting for the wheel cover 53. The pressure of the clamp will hold the wheel cover yieldingly to the face of depending wall 50 of a body (or a fender) with a substantially horizontal pressure.

It is contemplated to use two reaches. With two, bracket 55 and its counterpart (not shown) will locate the wheel cover upwardly fore and aft. Arm extension 31' substantially seated on the top of edge 51, when in locked position, and its counterpart (not shown) will locate the wheel cover to its low limit position.

Figs. 9, 10 and 11 illustrate a further modification of the invention. Here depending wall 50 has a wheel exposing opening defined by an inturned edge 51. Substantially opposite to edge 51 is a rubber sealer 56 surrounding the periphery of a wheel cover 57. This cover is provided with a bottom flange 58.

Cover 57 is provided with a bracket 60 arranged to act as a guide for a releasable clamping device indicated generally at 61, preferably made of spring steel. The upper end is formed into a hook, here a vertical portion 62 is integral with connector 63, and the lower end thereof is formed into an angular side mover or cam 64 terminating in a reach 65. Parts 62, 63, 64 and 65 form a unit; on the top this unit is guided in bracket 60; on the bottom, at the lower end of reach 65, it is operatively connected to a spring arm 66. Spring arm 66 by a coiled loop connection is made part of an operating lever 70. Spring arm 66 and operating lever 70 are preferably of spring steel, and they are arranged by their coiled loop connection to be operatively fulcrum mounted on cover 57 as by bolt 71 in bracket 72 attached to flange 58. When operating arm 70 is lowered around its coil fulcrum the free end of spring arm 66 rises, lifting the reach and associated parts, vertical portion 62 leaving its contact with the inturned edge 51. Angular side mover 64, guided in an opening in bracket 60, will move vertical portion 62 laterally, to the inside of the automobile, clearing a path for the vertical insertion of the cover 57. Figs. 9 and 10 illustrate the mounted position in which the free end of operating arm 70, while in tensioned position, is hooked on flange 58; this tension yieldingly but constantly pulls reach 65 downwardly, and by the reaction of this force, holds cover 57 upwardly against the recesses in brackets 73 at each corner of the cover 57 (only one shown), and illustrated in Figs. 9 and 11.

Fig. 12 is a modification of the upper part of Fig. 10. Here depending wall 80 is provided with a pilot hole 81. In it is positioned pilot pin 82 integral with bracket 83. Bracket 83 at its upper end is welded to the periphery of wheel cover 84. The weld is surrounded by a rubber sealer 85 and part of it is interposed between cover 84 and wall 80. Reach 65' connects to angular side mover 64' guided in bracket 83, connections 86 terminating in foot 87. The downward pull of reach 65' by the angle of angular side mover 64' will tighten the cover 84 to wall 80. The lift of said reach will permit the separation of these parts. As is clear from Fig. 12 wall 80 at its inner side is connected to a wheel housing 88. This wheel cover is placed in position in two movements, the vertical one to lift the cover in position, the horizontal one to engage pilot pin 82 in pilot hole 81.

What applicant claims as his invention:

1. A clamp, adapted to be used on a closure for a downwardly open wheel-exposing opening defined by a curved edge in a depending outside wall of a vehicle, including a reach, retaining means for said closure including an angularly disposed portion at the upper end of said reach having means adapted to engage and clamp said depending wall above said edge, a guide bracket fixed to said closure and provided with an opening for the reception of the upper part of said reach, crank operating means at the lower end of said reach positioned adjacent the lower edge of the closure and means releasably securing the crank and reach against closure releasing movement.

2. A clamp, adapted to be used on a closure for a downwardly open wheel-exposing opening defined by a curved edge in a depending outside wall of a vehicle, including a reach, retaining means for said closure including an angularly disposed portion near the end of the reach having means adapted to engage and clamp said depending wall above said edge, a guide bracket fixed to said closure and provided with an opening for the reception of the wall engaging end of said reach, crank operating means at the opposite end of said reach and means releasably securing the crank and reach against closure releasing movement.

JULES HALTENBERGER.